(12) United States Patent
Green

(10) Patent No.: US 7,607,999 B2
(45) Date of Patent: Oct. 27, 2009

(54) GOLF GREEN READING DEVICE

(76) Inventor: Daniel Green, 341 Arrowhead Dr., Palm Desert, CA (US) 92211

( * ) Notice: Subject to any disclaimer, the term of this patent is extended or adjusted under 35 U.S.C. 154(b) by 178 days.

(21) Appl. No.: 11/926,795

(22) Filed: Oct. 29, 2007

(65) Prior Publication Data

US 2008/0056621 A1 Mar. 6, 2008

Related U.S. Application Data

(63) Continuation-in-part of application No. 11/265,036, filed on Nov. 2, 2005, now abandoned.

(51) Int. Cl.
*A63B 57/00* (2006.01)
(52) U.S. Cl. .................... 473/404; 33/366.11
(58) Field of Classification Search ............... 473/404; 33/290, 366.11, 366.12, 366.14, 366.15, 33/366.18, 366.24
See application file for complete search history.

(56) References Cited

U.S. PATENT DOCUMENTS

| | | | |
|---|---|---|---|
| 2,511,525 A * | 6/1950 | Bradwell et al. ......... 33/366.12 |
| 3,293,755 A | 12/1966 | Cronwell | |
| 3,597,090 A | 8/1971 | Humphrey | |
| 3,869,806 A | 3/1975 | Humphrey | |
| 4,079,521 A | 3/1978 | Uhorezak | |
| 4,253,242 A | 3/1981 | McInerney | |
| 4,260,151 A | 4/1981 | Weaver | |
| 4,565,010 A | 1/1986 | Herman | |
| 4,590,680 A | 5/1986 | Hanchett et al. | |
| 4,625,423 A | 12/1986 | Sackett | |
| 4,654,977 A | 4/1987 | Pakus | |
| 4,703,315 A | 10/1987 | Bein et al. | |
| 4,984,791 A | 1/1991 | Labell | |
| 5,293,221 A | 3/1994 | Kitajima et al. | |
| 5,492,322 A | 2/1996 | Smith | |
| 5,503,393 A | 4/1996 | Casperson | |
| 5,520,384 A | 5/1996 | Wetzel | |
| 5,662,535 A | 9/1997 | Smith | |
| 5,792,015 A | 8/1998 | Hoyt et al. | |
| 6,102,817 A | 8/2000 | Boswell | |
| 6,165,083 A | 12/2000 | Stenger et al. | |
| 6,770,000 B2 | 8/2004 | Shelley | |
| 6,997,823 B2 | 2/2006 | Garza | |
| 2004/0177524 A1 | 9/2004 | Tan et al. | |
| 2004/0205973 A1 | 10/2004 | Barr | |

* cited by examiner

*Primary Examiner*—Steven Wong
(74) *Attorney, Agent, or Firm*—Polster, Lieder, Woodruff & Lucchesi, L.C.

(57) ABSTRACT

A golf green reading device has a lens with a reference line that is illuminated when the reference line is in a horizontal or vertical orientation. The reference line is illuminated by an electrical circuit secured within a housing having a power source, a light source, and a level switch. The user holds the device in a horizontal or vertical orientation to read the slope of a golf green relative to the reference line and determine the correct line to putt the golf ball.

26 Claims, 5 Drawing Sheets

US 7,607,999 B2

GOLF GREEN READING DEVICE

CROSS-REFERENCE TO RELATED APPLICATIONS

This application is a continuation-in-part of application Ser. No. 11/265,036 filed Nov. 2, 2005, now abandoned, from which priority is claimed and which is hereby incorporated by reference.

STATEMENT REGARDING FEDERALLY SPONSORED RESEARCH

Not Applicable.

BACKGROUND OF THE INVENTION

The present invention relates, in general, to a golf device and, more particularly, to a method and apparatus for reading golf greens.

For many golfers, putting is a source of reoccurring frustration. Poor putting can quickly add unnecessary strokes to a player's score during an otherwise well played round of golf. Even the best players can lose a round of golf because of a missed putt. As the often-quoted phrase goes, "Drive for show and putt for dough."

Often, the cause of poor putting is misreading the green. Putting greens are designed with contours of varying degrees of slopes to make putting a challenge for golfers, as well as for drainage purposes. Once a player's ball is on the green, he or she must navigate the correct path between the ball and the cup simply by looking at the putting green. To add to the confusion, many golf courses move the cup every few days to different positions on the green. Therefore, most putts are unique shots that present another opportunity for misreading the green. Some courses have caddies available at a considerable cost that are experienced in reading a particular course's putting greens. However, most courses do not provide caddies and the cost can be prohibitive at those that do. This leaves the challenge of reading greens to the players themselves.

Many different devices and techniques exist to aid the golfer with reading greens. To gauge the direction and degree of slope in a putting green, many golfers use the putter as a plumb bob sighting device by holding the handle at arm's length between thumb and index finger whereby the club assumes a generally vertical position due to the weight of the club head. In addition to this method, a number of portable sighting devices have been developed for golfers. However, all these previous devices have various drawbacks and shortcomings. For example, many devices use a mechanical leveling means, such as a bubble indicator, plumb bob, or crosshair that requires the user to manually align a bubble, bob, pendulum, or crosshair. However, such designs depend on the ability of the golfer to "line up" the device using various mechanical means, which introduce large tolerances and make the devices susceptible to human error.

Accordingly, there is a need for a inexpensive and easy to use device that is provides a reference line by which a golfer can read the slope of the green.

SUMMARY OF THE INVENTION

Briefly stated, a green reading device is provided, which has a lens with a reference line and which is secured to a housing. The device also includes an electrical circuit, having a power source, at least one light source, and at least one level switch secured to the housing. The light source is electrically connected to the power source and is capable of illuminating the reference line. The level switch is electrically connected to the power source and the light source so that the level switch activates the light source when the reference line is in either a horizontal or vertical orientation.

The foregoing and other features, and advantages of the invention as well as embodiments thereof will become more apparent from the reading of the following description in connection with the accompanying drawings.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
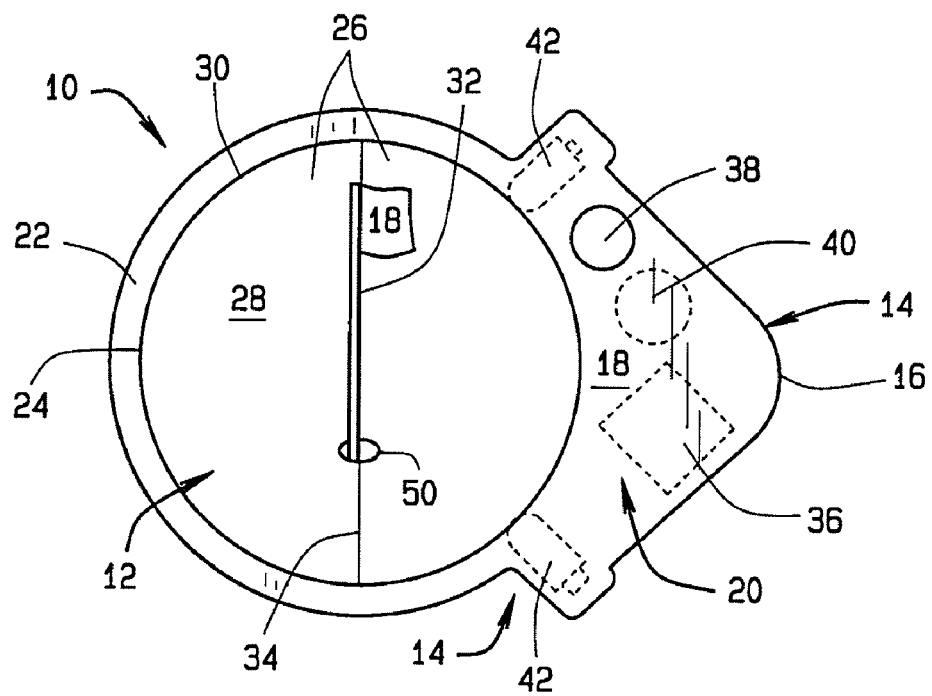
FIG. 1 is a front view of a first embodiment of a green reading device indicating a vertical orientation.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-4, a first illustrative embodiment of the present invention, generally referred to as a golf green reading device 10, includes a lens 12 secured to a housing 14. The lens is shown to be generally circular, but could take on other configurations, if desired. As further seen in FIGS. 6, 6A, 6B, 7A and 7B, the lens has a front surface or face, a back surface or face and a peripheral side edge. The lens is solid and comprises a light transmitting material between the first and second surfaces of said lens.

Figure 3:
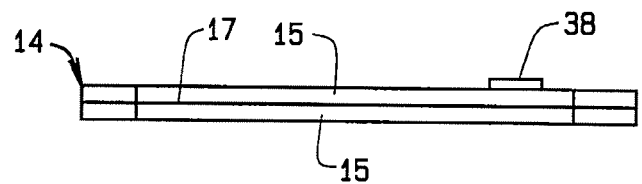
FIG. 3 is a side view of the first embodiment of the green reading device.

The housing 14 includes a main body 16 that defines a cavity 18 for housing an electrical circuit 20 and a cylindrical or ring-shaped frame 22 extending from the body 16 that defines an aperture 24 for receiving the lens 12. The body 16 also functions as a handle for holding the device 10, whereby the user holds the device 10 by gripping the body 16 between a thumb and an index finger. As shown in FIG. 3, the housing 14 can comprise two halves 15 that engage along a parting line 17 by any suitable means. The two halves 15 can be removably connected, such as by a friction fit or with fasteners, to provide access to the electrical circuit 20. The housing 14 can be made from any appropriate material, such as plastic or metal, but preferably an injection molded plastic.

The lens 12 can comprise two generally semi-circular segments 26 with each segment having generally flat viewing surfaces 28, an arcuately shaped retaining edge 30, and a generally linear mating edge 32. The mating edges 32 of the segments 26 mate to form the cylindrical lens 12 with the edges 32 creating a visible reference line 34 in the viewing surfaces 28. To secure the lens 12 to the housing 14, the retaining edges 30 are secured to the frame 22 with any appropriate means, such as a friction fit or an adhesive. In another embodiment, the frame 22 can define grooves (not shown) that receive the peripheral edges of the segments 26. The lens 12 can be made from any suitable transparent or translucent material known in the art, such as glass or plastic. Those skilled in the art will recognize that the reference line 34 can be created using other means, such as a score or groove in the lens, in which case, the lens is a one-piece lens.

Figure 2:
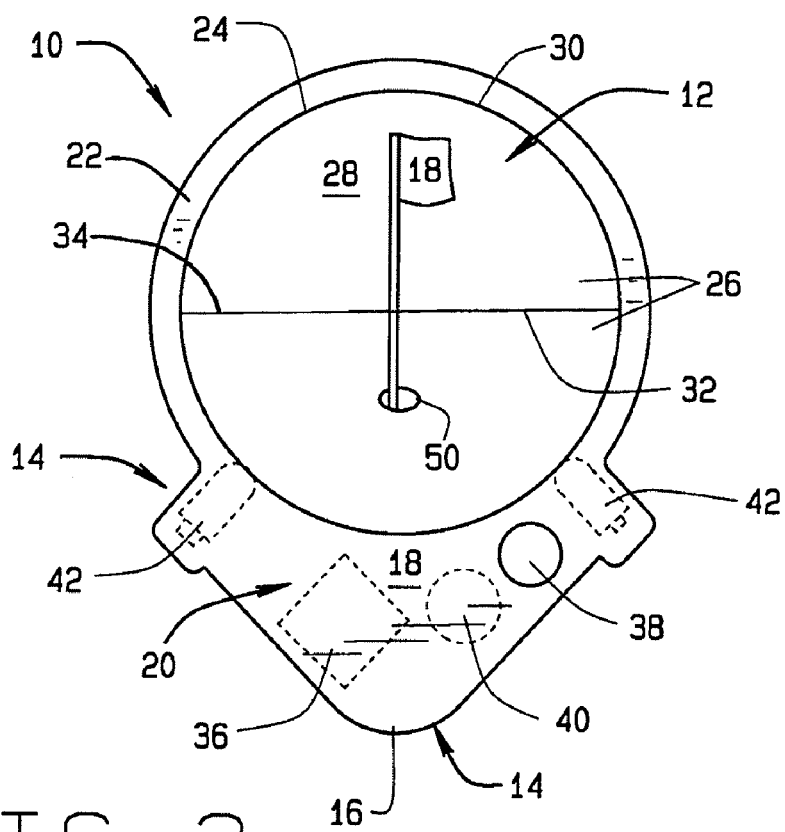
FIG. 2 is a front view of the first embodiment of the green reading device indicating a horizontal orientation.
Figure 4:
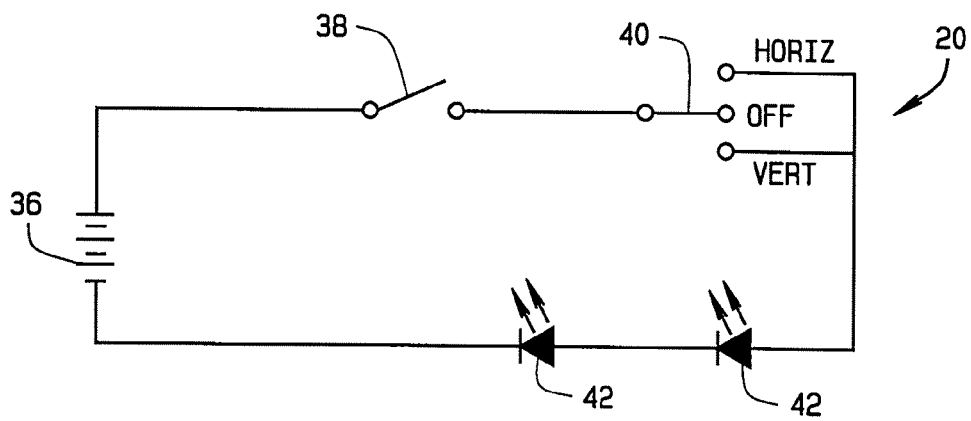
FIG. 4 is a schematic diagram of a control circuit of the green reading device.

As shown in FIGS. 1-2, and 4, the electric circuit 20 includes a power source 36, such as a battery, electrically connected to an on/off power switch 38, a level switch 40, and a pair of light sources 42. All the parts of the electric circuit 20 are contained within the cavity 18 of the housing 14. The battery can be a replaceable battery, in which case, the housing 14 would include a removable panel to access a battery compartment. Alternatively, the battery could be a permanent battery which could be a rechargeable battery. As a further alternative, the power source could comprise a solar cell.

The power switch 38 is a typical push-button switch that toggles between an on and off position, which respectively completes and interrupts the electric circuit 20. The power switch 38 enables the user to turn the device 10 on and off to conserve the power source 36 when the device is not in use. Those skilled in the art will recognize that any type of on/off power switch known in the art can be used. If desired, the on/off power switch 38 can be omitted with the understanding that the circuit 20 will be open when the device 10 is neither in the horizontal nor the vertical position.

The level switch 40 is a typical position dependant switch, such as a mercury switch, that detects a predetermined orientation of the reference line 34 and sends a corresponding electric signal to activate or deactivate the light sources 42. When the reference line 34 is in either a horizontal or vertical orientation, the level switch 40 completes the electric circuit 20, thereby activating the light sources 42. When the reference line 34 is in any other orientation, the level switch 40 interrupts the electric circuit 20, thereby deactivating the light sources 42. Those skilled in the art will recognize that any type of level switch or sensor can be used. For example, the switch can be a bubble switch. Although the switch 40 is shown as a single switch, those skilled in the art will recognize that the switch 40 can comprise two position dependant switches—one which closes when the device 10 is generally horizontal and one which closes when the device is generally vertical.

In the preferred embodiment, the light sources 42 are typical light emitting diodes (LEDs), which can emit light of any color. The light sources 42 are positioned to emit light onto the reference line 34 so that the reference line 34 is sufficiently illuminated to be visible to the user. The light emitted from the light source 42 travels through the lens material between the first and second surfaces or faces of the lens and reflects off the mating edges 32 of the lens segments 26 or the score in the single lens version. In this way, when the user looks at the viewing surface 28 of the lens 12 the light illuminates the reference line 34 without illuminating the rest of the lens 12. Although two light sources 42 are shown, a single light source 42 could be used. Further, the position of the light source 42 in the housing 14 could be altered from that shown in the drawing. Those skilled in the art will recognize that any appropriate light source can be used, such as a laser or fiber optic element. If a fiber optic element is to be used, the fiber optic element can comprise the reference line 34.

The overall size of the green reading device 10 is small enough to hold in the palm of the user's hand. As shown in FIG. 3, the device 10 also has a generally thin and flat profile. The small size and thin profile of the device 10 allows users to conveniently carry the device 10 around in their pants or shirt pocket or golf bag so they can easily access the device 10 when needed.

Figure 5:
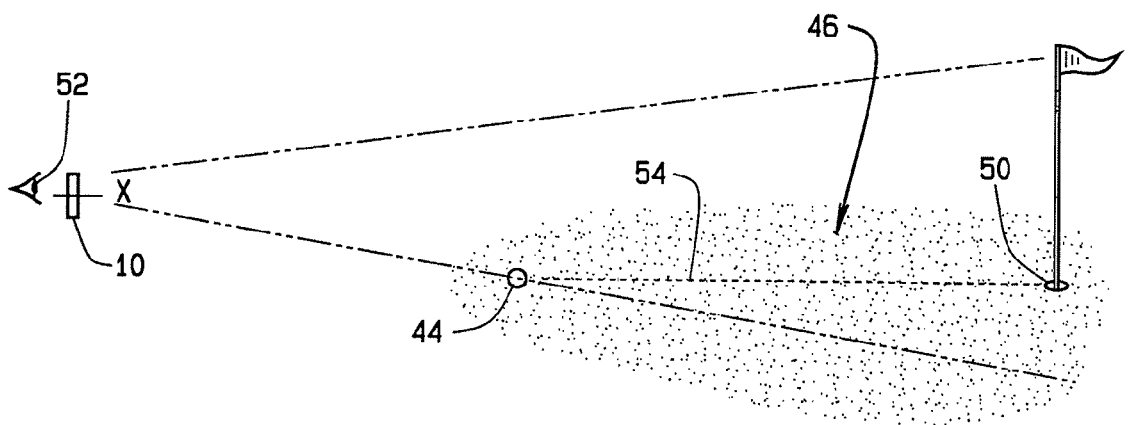
FIG. 5 is an illustrative view of a green reading device used to read a putting green.

In operation, the golfer uses the device 10 after a golf ball 44 comes to rest on a golf green 46, as shown in FIG. 5. The user takes a position behind the golf ball 44 and facing a direction along a straight line extending between a cup 50 and the ball 44. The user engages the power switch 38 to turn the device 10 on and holds the device 10 in a vertical orientation and in alignment with his eye 52 so that the green 46 is visible through the viewing surface 28. The user rotates the device 10 about a center axis until the reference line 34 reaches either a vertical or horizontal orientation. When the reference line 34 reaches either the horizontal or vertical orientation, the level switch 40 completes the electric circuit 20 and activates the light sources 42, which illuminate the reference line 34. The illuminated reference line 34 signals to the user that the reference line 34 is in either a horizontal or vertical orientation. The user now sees on the viewing surface 28 an illuminated reference line 34 superimposed over the view of the golf green 46. By observing the reference line 34 over the view of the green 46, the user determines which direction the golf green 46 is sloped and therefore, the direction 54 he or she must putt the ball 44 to put it in the hole 50.

Figure 6:
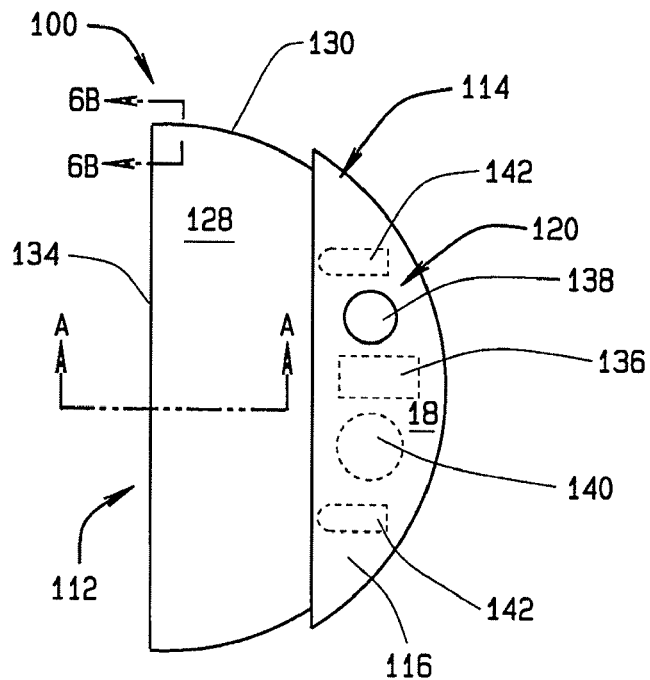
FIG. 6 is a front view of a second embodiment of a green reading device.

The present invention can also be embodied in the form shown in FIG. 6, which illustrates a second embodiment of the device 100 similar to the first embodiment of the device 10. For easier reference, common elements have been numbered using the same numbers as in the first embodiment, except with a "100" prefix.

In the second embodiment of the device 100, the housing 114 has generally lens 112 with arcuate sides or ends 130 and a flat edge defining a reference line 134. Unlike the reference line 34 of the device 10, the reference line 134 is defined by an exposed edge of the lens 112. The lens is secured to the housing 114. The device 100 as illustrated does not include a frame which extends along the side edges of the lens. However, such a frame could be provided if desired. The electric circuit 120 is identical to the electric circuit 20 of device 10, and hence, will not be described.

Like the first embodiment 10, the second embodiment 100 operates by illuminating the reference line 134 when the user holds the device in a horizontal or vertical orientation. By observing the reference line 134 over the view of the green 46, the user determines which direction the golf green 46 is sloped and therefore, the direction 54 he or she must putt the ball 44 to put it in the hole 50.

Figure 6A:
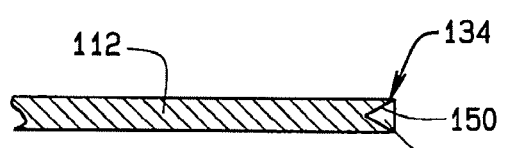
FIG. 6A is a cross-sectional view taken along line A-A of FIG. 6
Figure 7A:
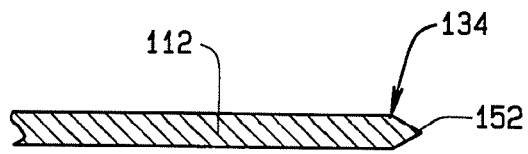
FIGS. 7A and B are sectional views of alternate embodiments of the lens.
Figure 6B:
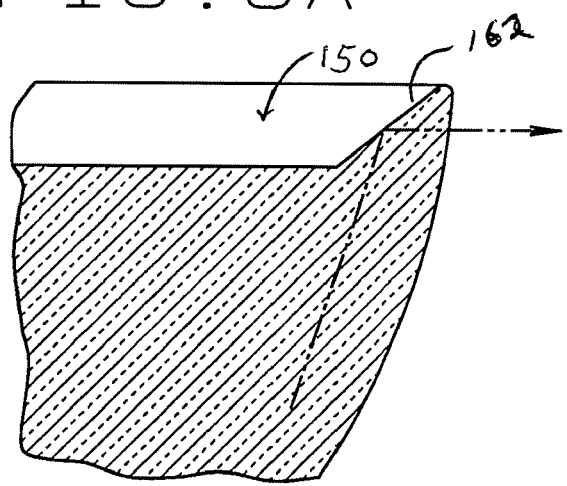
FIG. 6B is an enlarged cross-sectional view taken along line 6B-6B of FIG. 6
Figure 7B:
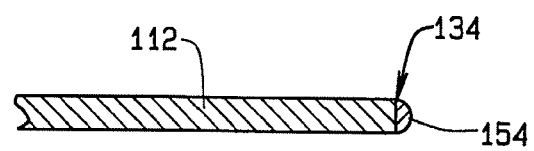

As shown in FIGS. 6A and B, the reference line 134 can comprise the edge of the lens 112, and this edge can embody different shapes that enhance the visibility or reflectivity of the reference line 134. As seen in FIG. 6, the edge 134 comprises only a part of the peripheral edge of the lens 112, the remainder of the peripheral edge being defined by the curved edges at the top and bottom of the lens (with reference to FIG. 6). As shown in FIGS. 6A-B, the reference line 134 can be a V-shaped channel 150. In FIG. 7A, the reference line 134 is a V-shaped protrusion 152; and in FIG. 7B, the edge defining the reference line 134 is covered by a reflective material 154 to make the edge more visible when illuminated. The edge or reference line could also be flat. Those skilled in the art will recognize that other shapes can be used to enhance the visibility or reflectivity of the reference line.

Figure 8:
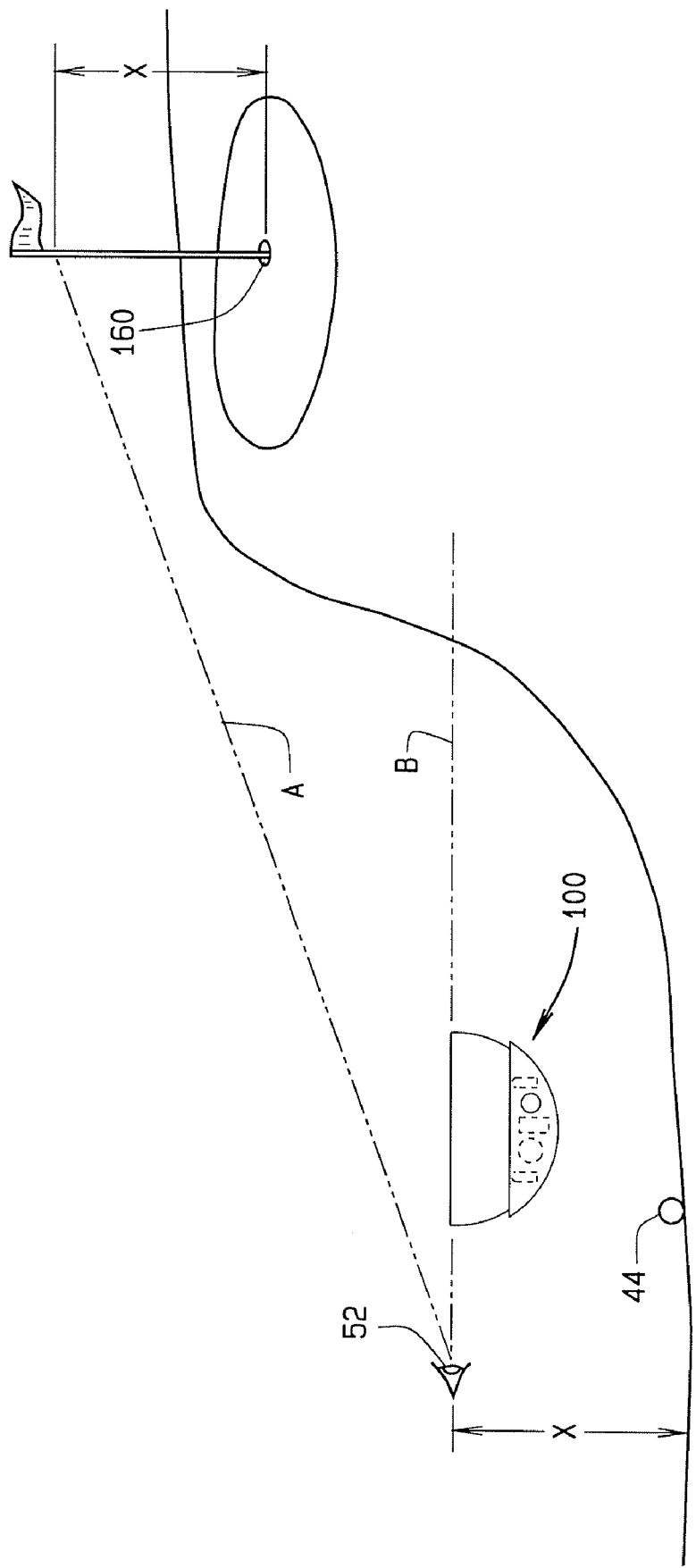
FIG. 8 is an illustrative view of a green reading device used to determine the relative elevation of a golf shot.

As shown in FIG. 8, the second embodiment of the device 100 can also be used to determine the relative elevation of a target 160 for a golf shot. In operation, the user holds the device so that the longitudinal axis of the reference line 134 points at desired target 160. The user slowly rotates the angle of the device 100 upwardly or downwardly until the reference line is illuminated, thereby, signaling to the user that the device is horizontal. From this, the user can determine if the target 160 is at a higher elevation or a lower elevation relative to the golf ball 44. As shown in FIG. 8, the user rotates the device downwardly from target position A to horizontal position B, which signals to the user that the target is at a higher elevation relative to the ball 44. To aid viewing of the illuminated reference line, the device can include cants 162 at one or both ends of the lens edge. As seen in FIGS. 6A-B, the cants 162 form ends to the V-shaped channel 150 which defines the reference line 134. When the device is horizontal, the reference line 134 will be illuminated, as described above. At the same time, the cants 162 will also be illuminated, making it easier for the user to see that the reference line has been illuminated.

Figure 9A:
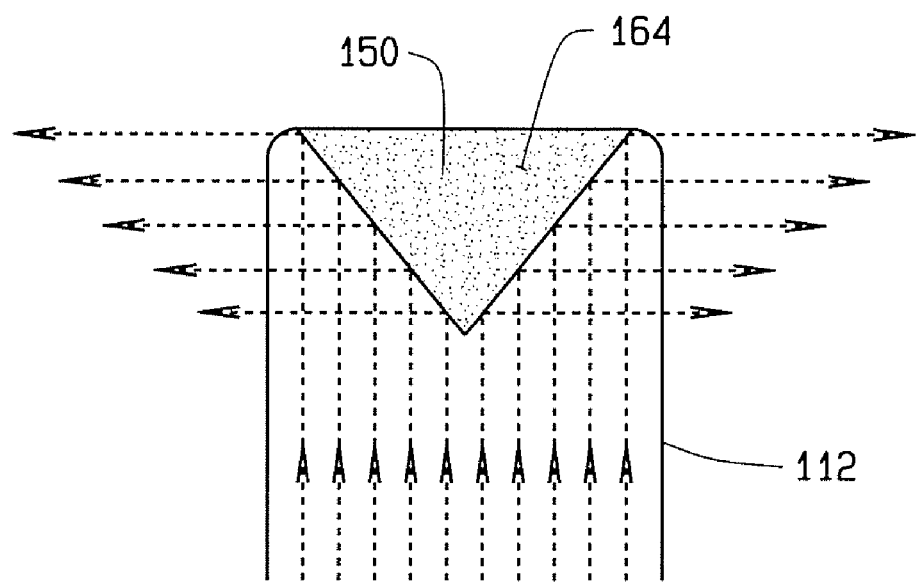
FIG. 9A is a cross-sectional view of a green reading device lens similar to that of FIG. 6A, but showing the channel filled with a filler which will reflect light.

The V-shaped channel 150 can be filled with a material 164 as shown in FIG. 9A. The material 164 has a reflective surface adjacent the walls of the channel 150 to reflect light from the light emitting devices to the faces of the lens 112 near the edge of the lens 112. This will make it easier for the user to determine when the edge is illuminated, and hence when the device 110 is in the vertical or horizontal position, as shown by the light rays depicted in FIG. 9A. The fill material can be opaque, in which case it will inherently have a reflective surface. Alternatively, the fill material 164 can be transparent or translucent. In this case, there will be a reflective coating between the fill material 164 and one or both of the walls of the channel 150. As an alternative, the walls of the channel 150 can be coated with a reflective material, and the fill material can be omitted. However, the fill material will keep dirt out of the channel 150, and omission of the fill material may allow dirt to accumulate in the channel 150. Further, the fill material will help prevent scratching or the channel walls and/or delamination of a coating applied to the channel walls.

Figure 9B:
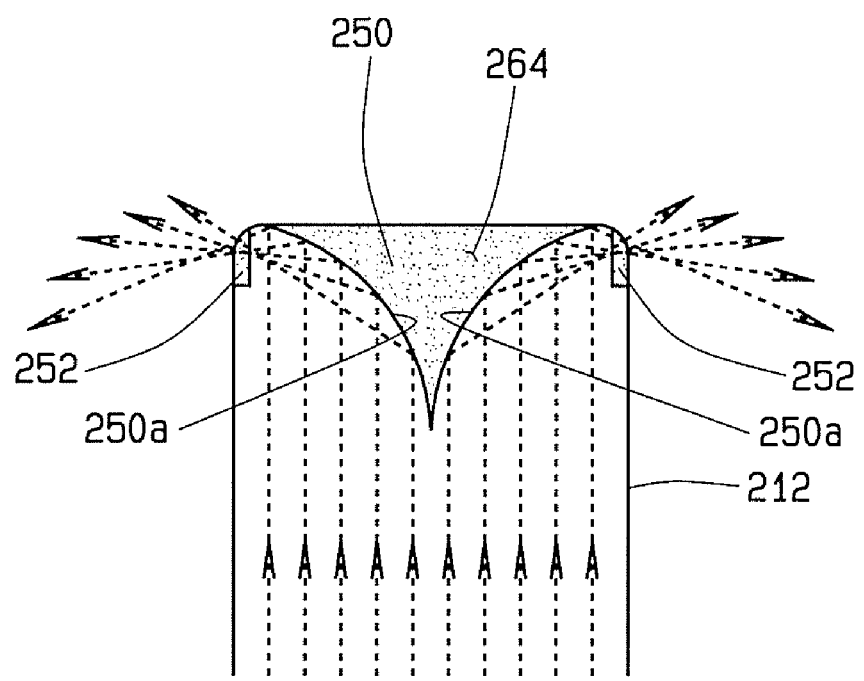
FIG. 9B is a cross-sectional view similar to that of FIG. 9A, but wherein the channel has a parabolic shape.

In FIG. 9B, the device includes a lens 212 having a channel 250 filled with a material 264 which can facilitate reflection of light. The channel 250, however, is not defined by straight side walls, as is the channel 150. Rather, the channel 250 is defined by parabolic walls 250a. The lens 212 is additionally provided with targets 252 positioned on opposed surfaces of the lens adjacent the edge of the lens. The targets 252 can be comprise a frosted surface on the lens 212. In the lens 212, the light from the light emitting device would be reflected by the surface of surface/wall 250a of the channel 250 and would be focused on the targets, as shown by the rays depicted in FIG. 9B.

Changes can be made in the above constructions without departing from the scope of the invention, it is intended that all matter contained in the above description or shown in the accompanying drawings shall be interpreted as illustrative and not in a limiting sense. For example, although the lens is shown to have flat faces, the lens can have arcuately shaped faces or viewing surfaces 28, such as convex or concave surfaces, which enlarge, reduce, or otherwise alter the image seen through the lens 12. Also, the lens 12 can be any shape, such as square, elliptical, or any rectilinear or curvilinear shape. The lens 12 can be tinted to enhance the illumination of the reference line 34 or simply for aesthetic reasons. Other embodiments can include indentations on the outside surface of the body 16 to receive fingers for ergonomic handling of the device 10. In yet another embodiment, the lens 12 can be unitary with the housing 14. The reference line can also be a fiber optic filament, which is illuminated along its length when a light source is activated. The device can have a single light source or multiple light sources. Although shown with a single reference line, the device can be provided with two reference lines—a vertical reference line and a horizontal reference line. If two reference lines are provided, the circuit 20 can illuminate only one of the lines or both of the lines. These examples are illustrative only.

What is claimed is:

1. A green reading device comprising:
   a housing;
   a lens assembly secured to the housing said lens assembly comprising at least one lens having a front surface, a back surface and a peripheral side edge; said peripheral side edge defining a plane of said lens; said at least one lens being solid and comprising a light transmitting material between said front and back surfaces of said lens; the lens having a reference line which is capable of being illuminated; and
   an electrical circuit comprising;
   a power source;
   at least one light source, the at least one light source being electrically connected to the power source; said at least one light source being positioned to direct light through the lens material between the front and back surfaces of the lens in a direction generally parallel to said plane of said lens; the light from the light source illuminating the reference line when the light source is activated; and
   at least one level switch, the at least one level switch being electrically connected to the power source and the at least one light source so that the level switch activates the at least one light source when the reference line is in either a horizontal or vertical orientation.

2. The green reading device of claim 1 wherein the lens comprises two segments having edges that mate to form the reference line.

3. The green reading device of claim 1 wherein the lens is a one-piece lens; said reference line being defined by a score on the lens.

4. The green reading device of claim 1 wherein the reference line is defined by at least a portion of said peripheral edge of said lens; said edge comprising a sloped or curved surface.

5. The green reading device of claim 4 wherein said edge comprises a pair of opposed inwardly sloping surfaces defining a channel extending along at least a portion of said edge.

6. The green reading deice of claim 5 wherein said channel is defined by generally straight walls.

7. The green reading device of claim 5 wherein said channel is defined by parabolic walls.

8. The green reading device of claim 4 including a target on at least one of said front and back surfaces of said lens; said target being positioned relative to said reference line such that light from said light source reflected from said reference line is directed to said target.

9. The green reading device of claim 5 wherein a reflective material is adjacent the walls of said channel to reflect light from said light source toward at least one face of said lens.

10. The green reading device of claim 5 wherein said channel is filled with a material; said material being reflective or having a reflective surface.

11. The green reading device of claim 5 wherein said channel includes end walls; said end walls defining a cant.

12. The green reading device of claim 1 including a fiber optic element extending at least part way across said lens, said fiber optic element being illuminated by said light emitting device when said light emitting device is activated; said fiber optic element defining said reference line.

13. A green reading device comprising:
a housing;
a lens assembly secured to the housing; said lens assembly comprising at least one lens having a front surface, a back surface and a peripheral side edge, said peripheral side edge defining a plane of said lens; said lens being solid and comprising a light transmitting material between said front and back surfaces of said lens; the lens having a reference line;
an electrical circuit contained within the housing, the electric circuit comprising a power source, at least one light source, and at least one level switch; whereby, the level switch closes the circuit to activate the at least one light source when the reference line is in either a horizontal or vertical orientation; said at least one light source being positioned to direct light through the lens material in a direction generally parallel to said plane of said lens between the front and back surfaces of the lens; the light from the light source illuminating the reference line when the light source is activated; the reference line having a shape such that light from said light source will be reflected toward at least one of said front and back surfaces.

14. The green reading device of claim 13, further comprising a power switch.

15. The green reading device of claim 13 wherein the at least one lens comprises a generally straight edge, said edge defining said reference line.

16. The green reading device of claim 15 wherein said straight edge comprises at least a portion of said peripheral edge of said lens assembly.

17. The green reading device of claim 15 wherein said lens assembly comprises a second lens; said second lens having a generally straight edge; the straight edges of said two lenses abutting each other.

18. A green reading device comprising:
a housing;
a lens comprising a lens assembly having at least one lens comprising a front surface, a back surface and a peripheral side edge, said peripheral side edge defining a plane of said lens; said at least one lens being solid and comprising a light transmitting material between said front and back surfaces of said lens; at least a portion of said peripheral edge defining a sloped or curved surface; said sloped or curved surface defining a reference line;
an electrical circuit contained within the housing, the electric circuit comprising a power source, at least one light source electrically connected to the power source, and at least one level switch, the at least one level switch being electrically connected to the power source and the at least one light source so that the level switch activates the at least one light source when the reference line is in either a horizontal or vertical orientation; the at least one light source being positioned such that light from said at least one light source will travel through the lens material in a direction generally parallel to said plane of said lens between said front and back surfaces of said lens to impinge upon said reference line; whereby; said reference line is illuminated when light from said at least one light source impinges upon, said reference line.

19. The green reading device of claim 18 wherein said lens further includes a cant formed at at least one end of said edge, said cant being shaped and positioned to be illuminated when said reference line is illuminated and to be visible to a user sighting along the edge of the lens.

20. The green reading device of claim 18 wherein said sloped or curved surface is shaped to reflect light from said light source toward at least one of said front and back surfaces of said lens such that said reference line is visible to a view looking through the lens in a direction generally normal to the front and back surfaces of the lens.

21. The green reading device of claim 20 wherein said at least a portion of said edge comprises a pair of inwardly sloped or curved surfaces which, in combination, define a channel.

22. The green reading device of claim 20 wherein said channel is filled with a material; said material being reflective or having a reflective surface.

23. The green reading device of claim 20 wherein a reflective material is adjacent the walls of said channel to reflect light from said light source toward at least one face of said lens.

24. A green reading device comprising:
a housing;
a lens assembly secured to the housing said lens assembly comprising at least one lens having a front surface, a back surface and a peripheral side edge; said peripheral side edge defining a plane of said lens; said at least one lens being solid and comprising a light transmitting material between said front and back surfaces of said lens; the lens having a reference line and a target on at least one of the front and back surfaces of the lens; the reference line being adapted to direct light toward said at least one target; and
an electrical circuit comprising;
a power source;
at least one light source, the at least one light source being electrically connected to the power source; said at least one light source being positioned to direct light through the lens material between the front and back surfaces of the lens in a direction generally parallel to said plane of said lens; the light from the light source illuminating the reference line and the reference line directing light to the target when the light source is activated; and
at least one level switch, the at least one level switch being electrically connected to the power source and the at least one light source so that the level switch activates the at least one light source when the reference line is in either a horizontal or vertical orientation.

25. A green reading device of claim 24 wherein said reference line is comprises at least a portion of the peripheral edge of said lens; said portion of the peripheral edge defining a sloped or curved surface.

26. The green reading device of claim 25 wherein said edge defines a channel; said channel being filled with a material that is reflective or has a reflective surface.

* * * * *